Sept. 8, 1936.  J. E. PIPES  2,054,042
CEMENT MIXING APPARATUS
Filed Aug. 16, 1934
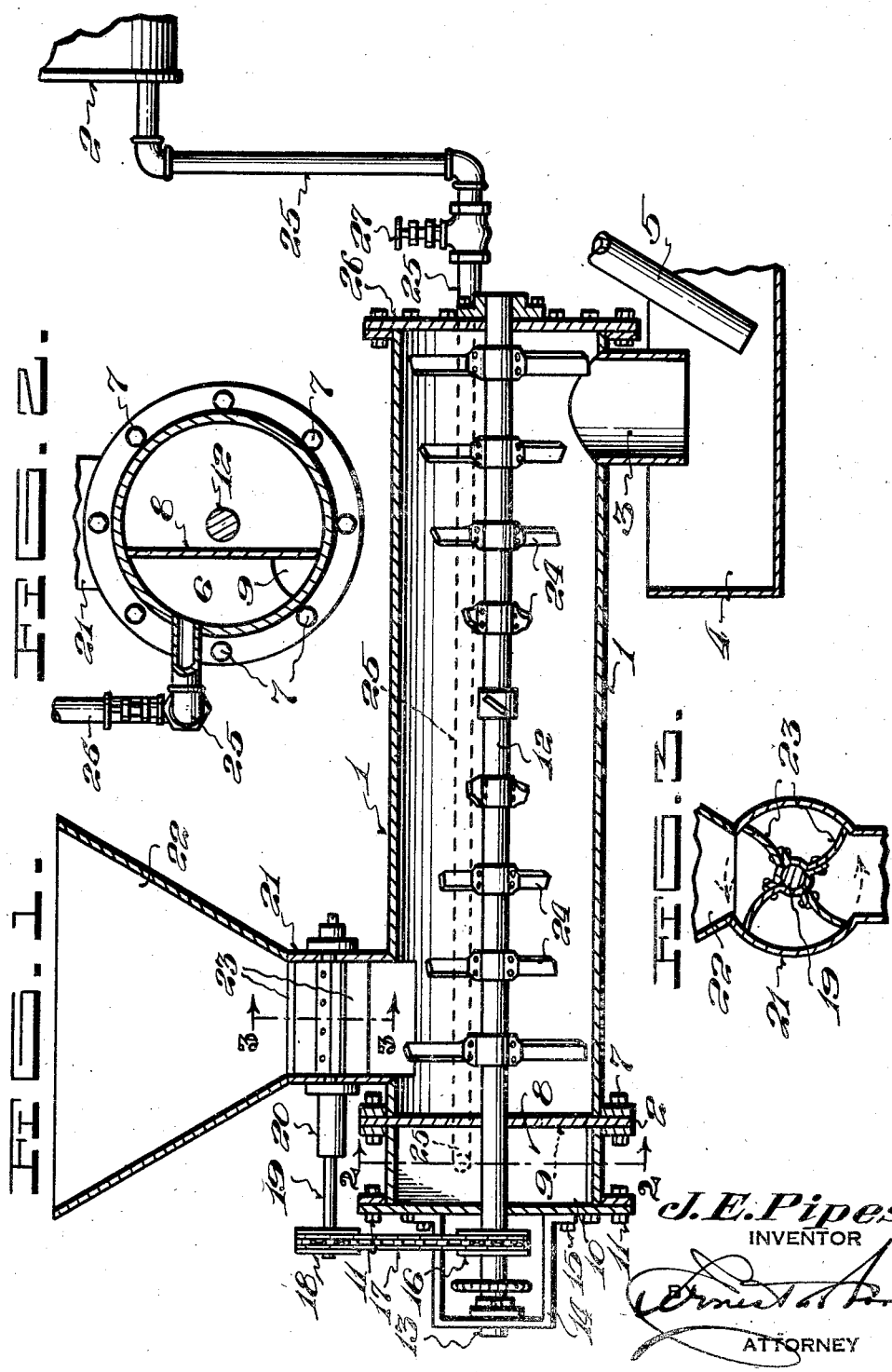
J. E. Pipes
INVENTOR
ATTORNEY Patented Sept. 8, 1936

2,054,042

UNITED STATES PATENT OFFICE 2,054,042

CEMENT MIXING APPARATUS

Joseph E. Pipes, Greggton, Tex., assignor to Consolidated Oil Well Cementing Corporation, of Texas Application August 16, 1934, Serial No. 740,112

1 Claim. (Cl. 83—73)

This invention relates to well cementing equipment and it has particular reference to apparatus for mixing cement preparatory to its introduction into a well cementing the same.

The principal object of the invention is to provide a combination of elements arranged to cooperate in reducing the cement to the desired uniform consistency by mixing therewith water in the exact proportions by means of a suitable water control chamber. The particular arrangement of the elements of the invention is also effective in maintaining a uniform flow of cement into the well, which is necessary to insure a thorough job and to effect a saving in time.

Another object of the invention is to provide a cement control valve operating to proportion the quantity of cement introduced into the mixing chamber and to prevent choking or balling up. Uniformity of feed, both in the cement and water will insure a thorough mix and uniform consistency.

Still another object of the invention is to provide a cement mixer of the closed throat type, wherein packing glands are unnecessary inasmuch as the conveyor shaft bearings are not exposed to the water, due to the improved type of water control chamber.

With the foregoing objects as paramount, the invention has particular reference to its salient features of construction and arrangement of parts which will become manifest as the description proceeds, taken in connection with the accompanying drawing, wherein:—

Figure 1 is an axial sectional view of a cement mixer constructed according to the present invention.

Figure 2 is a view on lines 2—2 on Figure 1, and

Figure 3 is a detail view of the cement control valve on lines 3—3 on Figure 1.

Continuing with a more detail description of the drawing, reference is primarily made to Figure 1 in which is shown the barrel 1 which will be hereinafter referred to as the mixing chamber. The ends of the mixing chamber are closed by means of the end plates 2 and has an outlet 3, discharging into a sump 4 from which the cement is drawn by means of a suitable pump, not shown, through the pipe 5, to be introduced into the well.

A feature of importance in the present invention resides in the extension of the mixing chamber 1 which defines the chamber 6, and is affixed by bolts 7 to one end of the mixing chamber 1. It will be noted that both ends of the chamber 1 are flanged, the plate 2 covering one end while the plate 8 serves to separate the water control chamber 6 from the chamber 1 except for the aperture 9 in the plate 8 through which water passes from the chamber 6 to the mixing chamber 1.

A plate 10 closes the end of the extension and is secured by bolts 11.

A shaft 12 extends longitudinally through the mixing chamber 1 and extension and is operated by a bearing 13 supported by the bracket 14, the latter being secured to the end plate 10 by bolts 15. A sprocket 16 is mounted near the end of shaft 12, over which passes a chain 17 to surround a similar sprocket 18, mounted on a short shaft 19. The shaft 19 has a substantially long bearing 20 to reinforce the same and extends through the throat 21 of the hopper 22, into which the cement or other material to be mixed is dumped.

The shaft 19 carries blades 23 which are curved in the manner shown in Figure 3 to more effectively transfer the material in predetermined portions into the mixing chamber 1 where it is received and conveyed by means of the blades or paddles 24 toward the discharge end of the chamber 1.

Reference to Figure 2 will disclose the advantages of the water control chamber 6. The partition 8 separates the water, entering the chamber 6 through pipe 25, from the conveyor shaft 12 when first introduced into the chamber 1, the cement is, of course, in dry powder form and when water from the chamber 6 is introduced through aperture 9, the consistency of the mass does not become sufficiently liquid to pass through the bearing holes of the partition 2 at the point of initial introduction, and it is rapidly moved toward the outlet 3 by the blades 24. Accordingly, no packing is required at the points in the chamber 1 through which the shaft 12 passes, hence, a considerable saving in time and expense is realized.

A tank 26 affords a reserve water supply from which water is conveyed to the water control chamber 6 through pipe 25 and the supply of water may be governed by the valve 27.

Manifestly, the construction shown is capable of considerable modification and such modification as is considered within the scope and meaning of the appended claim is also considered within the spirit and intent of the invention.

What is claimed is:

A cement mixing apparatus for well cementing operations, the combination of a mixing chamber and an auxiliary chamber in end to end relationship, a partition in said auxiliary chamber defining a dry compartment and a water compartment, means for introducing water into said water compartment preparatory to its reception by said mixing chamber, a shaft extending axially through said latter chamber and said dry compartment, blades radially and spirally disposed on said shaft, a cement feeding hopper disposed on said mixing chamber above the point of introduction of said water, rotary means within said hopper for introducing cement in predetermined quantities into said mixing chamber, means for rotating said shaft and means for actuating said cement introducing means from said latter means.

JOSEPH E. PIPES.